UNITED STATES PATENT OFFICE.

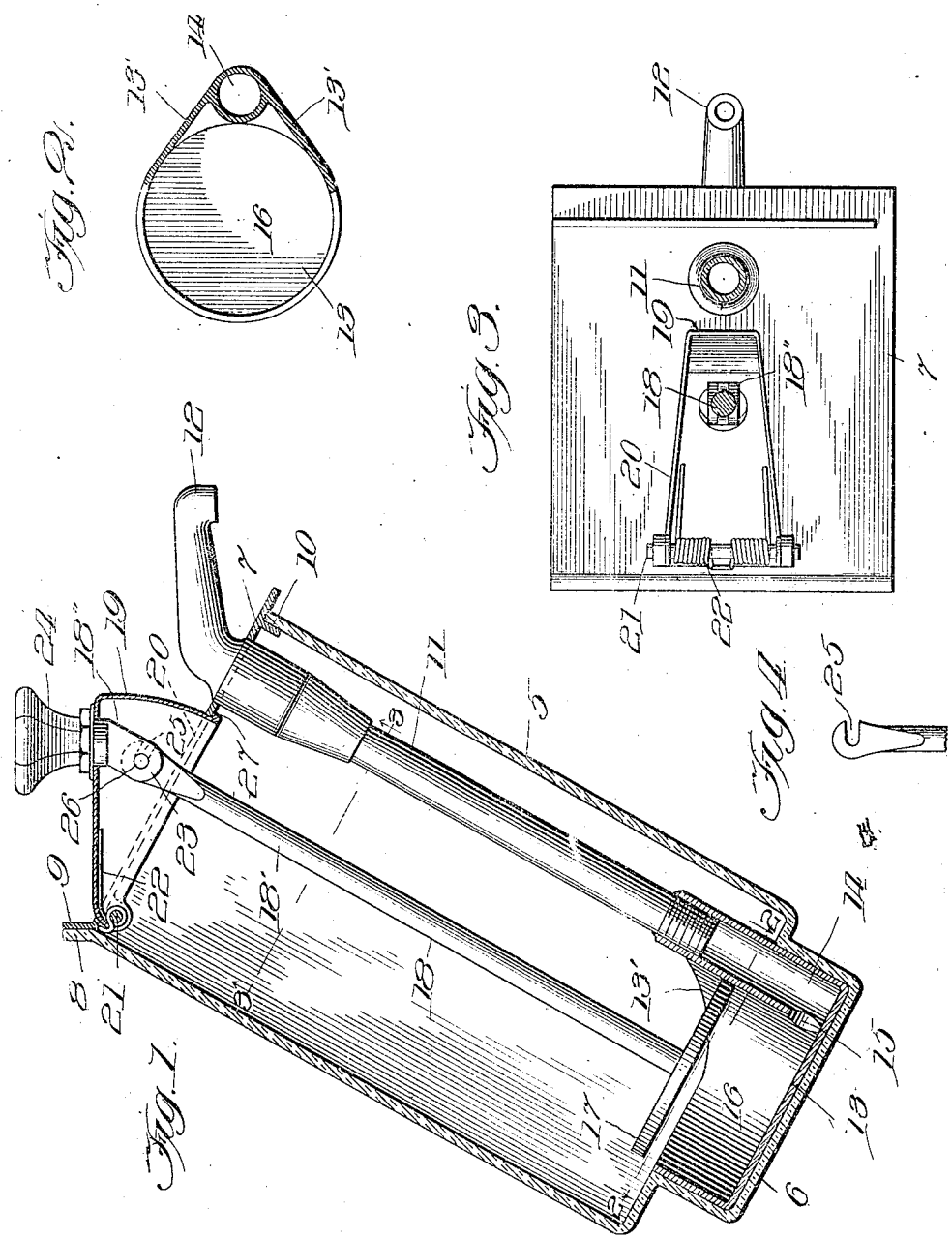

WALTER L. BODMAN, OF MAYWOOD, ILLINOIS, ASSIGNOR TO THE LIQUID CARBONIC COMPANY, OF CHICAGO, ILLINOIS, A CORPORATION OF ILLINOIS.

SYRUP-JAR.

No. 825,181.     Specification of Letters Patent.     Patented July 3, 1906.

Application filed January 2, 1906. Serial No. 294,155.

*To all whom it may concern:*

Be it known that I, WALTER L. BODMAN, a subject of the King of Great Britain, residing at Maywood, in the county of Cook and State of Illinois, have invented new and useful Improvements in Syrup-Jars, of which the following is a specification.

The object of this invention is to provide a syrup-jar having dispensing means of simple and inexpensive construction and which can be thoroughly and easily cleaned.

The invention also has other objects in view, which will be fully and clearly pointed out hereinafter in a detailed description of the embodiment of the invention illustrated in the accompanying drawings, in which—

Figure 1 is a sectional elevation. Fig. 2 is a sectional view on the line 2 2 of Fig. 1. Fig. 3 is a sectional view on the line 3 3 of Fig. 1. Fig. 4 is a detail view.

The invention comprises a jar 5, having a chamber 6 in its bottom. The jar is open at its top and is closed by a lid 7. The lid may be variously constructed to fit in or on the jar; but in the particular embodiment of the invention illustrated in the drawings I have shown the jar provided at its back with an angularly-projecting lip 8, and the lid is similarly provided with an angularly-projecting lip 9 to lie snugly against the lip 8. The lid rests upon the front and sides of the jar and is provided with a lip 10, which lies in that side of the jar against the front thereof. The weight of the lid will cause the lip 9 to lie tightly against the lip 8 and the lip 10 to lie tightly against the front of the jar and also cause the lid to fit snugly upon the side and front edges of the jar, and thus form a tight closure.

A discharge-tube 11 is fastened to the lid and is provided with a discharge-spout 12. The discharge-tube extends down in the jar and carries a cup 13, which is constructed to fit snugly in the chamber 6 in the bottom of the jar. This cup comprises a tubular part 14, which communicates, through an opening 15 at the bottom of the cup, with the chamber 16. The tubular part 14 constitutes a continuation of the discharge-tube 11, and the chamber 16 is shaped to receive the plunger 17, which is carried by the stem 18. The upper end of this stem is fastened to the hood 19, movably arranged in an opening 20 in the lid and pivoted at its rear end to the lid at 21. This hood is of segmental shape and is normally held in elevated position, extending above the plane of the lid, as shown in Fig. 1, by a spring 22. The stem is provided with a hinged joint 23 within the hood, and a handle 24 is mounted on the hood, preferably near the front thereof. The hinged joint in the stem is preferably made so that the stem and plunger can be readily detached, if desired, for cleaning. The lower part of the stem 18', which swings, may be provided with a jaw 25 to receive the pivot-pin 26 on the upper stationary part 18'' of the stem.

In the embodiment of the invention illustrated in the drawings the jar and the dispensing apparatus are intended to be supported at an inclination, as indicated in Fig. 1, in which position the plunger 17 will rest against the tubular part 14 and will be held against displacement by the web guides 13' on the cup. By reason of the inclination of the stem when in operative position the jaw can be made readily detachable from the pivot-pin and does not necessitate the provision of fastening devices. All the parts of the dispensing apparatus are fastened to the lid, and when removed from the jar they are accessible for cleaning purposes.

The plunger and its stem may be swung back from above the cup to permit the latter to be cleaned or removed from and replaced on the discharge-tube 11, or the stem may be detached, as heretofore explained. No valves are employed in this dispensing apparatus; but the plunger is normally held above a part at least of the edge of the cup to permit the cup to fill with syrup. When the handle 24 is operated to depress the hood, the plunger will force the contents of the chamber 16 through the opening 15 and into the discharge-tube 14. The size of the chamber 16 determines the quantity of syrup discharged, and hence it is possible to measure the quantity of syrup to be discharged by causing the plunger to make a full stroke or a partial stroke, as desired. The hood 19 constitutes a housing for the joint 23 and also forms a complete closure at all times for the opening 20 in the lid. The spring is of sufficient strength to return the hood and the plunger to their normal elevated position, and a stop 27 is provided on the hood to limit its upward movement.

The dispensing apparatus is of very simple construction and comprises comparatively few parts, which can be made of any suitable material and of desired sizes and proportions. The facility with which the jar and dispensing apparatus may be cleaned is of especial importance in this class of devices, and the simplicity of construction makes the invention inexpensive to manufacture and easy to adapt to jars and fountains and counters as may be required.

I prefer to provide the chamber in the bottom of the jar to receive the cup, for this arrangement enables practically all of the syrup in the jar to be discharged. However, the bottom of the jar may be made perfectly flat and the cup rested thereon, if desired.

What I claim, and desire to secure by Letters Patent, is—

1. The combination of a syrup-jar, a cup therein, a discharge-tube connected to said cup, a plunger arranged to operate in the cup, a lid for the jar, a hood pivoted to the lid and arranged to operate in an opening in the lid, and a stem carrying the plunger and connected to said hood.

2. The combination of a syrup-jar, a cup therein, a discharge-tube connected to said cup, a plunger arranged to operate in the cup, a lid for the jar, a jointed stem connected to the lid and carrying said plunger, and means for operating the plunger.

3. The combination of a syrup-jar, a cup therein, a discharge-tube connected to said cup, a plunger arranged to operate in the cup, a lid for the jar, a hood pivoted to the lid and arranged to operate in an opening in the lid, and a jointed stem carrying said plunger and connected to said hood.

4. The combination of a syrup-jar, a cup therein, a discharge-tube connected to said cup, a plunger arranged to operate in the cup, a lid for the jar, a segmental hood pivoted to the lid and operating in an opening in the lid, and a stem carrying said plunger and connected to said hood.

5. The combination of a syrup-jar, a cup therein, a discharge-tube connected to said cup, a plunger arranged to operate in the cup, a lid for the jar, a hood pivoted to the lid and operating in an opening in the lid, and a stem carrying said plunger and connected to said hood, said stem having a hinged joint within the hood.

6. The combination of a syrup-jar, a cup therein, a discharge-tube connected to said cup, a plunger arranged to operate in the cup, a lid for the jar, a segmental hood pivoted to the lid and operating in an opening in the lid, and a stem carrying said plunger and connected to the hood, said stem having a hinged joint within the hood.

7. The combination of a syrup-jar, a cup therein open at the top, a discharge-tube connected to said cup, a plunger arranged to operate in the cup, a stem independent of the discharge-tube, and means for supporting the plunger normally above the edge of the cup to permit the syrup to flow into the cup.

8. The combination of a syrup-jar, a cup therein open at the top, said cup comprising a tubular part and a chamber communicating with each other, a discharge-tube connected to said tubular part, and a plunger arranged to operate in said chamber.

9. The combination of a syrup-jar, a chamber in the bottom of said jar, a cup seated in said chamber, said cup comprising a syrup-chamber and a tubular part communicating with each other, a discharge-tube connected to said tubular part, a plunger arranged to operate in said syrup-chamber, a lid for the jar, a segmental hood pivoted to the lid and arranged to operate in an opening in the lid, and a stem carrying said plunger and connected to said hood.

10. The combination of a syrup-jar, a lid therefor, a cup, a discharge-tube connected to the lid and the cup, a plunger arranged to operate in the cup, a stem carrying the plunger and pivotally hung beneath the lid, and means for operating said plunger.

11. The combination of a syrup-jar, a lid therefor, a cup, a discharge-tube connected to the lid and the cup, a plunger arranged to operate in the cup, a spring-pressed segmental hood pivoted to the lid and arranged to operate in an opening in the lid, and a stem connected to said hood and carrying said plunger, said stem being made in two parts, one part having a pivot-pin and the other part having a jaw to engage said pivot-pin.

12. The combination of a syrup-jar to be supported for use in an inclined position, a cup in the bottom of the jar, a discharge-tube connected to said cup, and a plunger arranged to rest by gravity in an inclined position to operate in the cup.

13. The combination of a syrup-jar to be supported for use in an inclined position, a cup therein, a guide on the cup, and a plunger arranged to rest by gravity against said guide in an inclined position to enter the cup.

14. The combination of a syrup-jar to be supported for use in an inclined position, a cup therein comprising a tubular part and a plunger-chamber, a discharge-tube connected to said tubular part, and a plunger arranged to rest by gravity in an inclined position against the tubular part to enter said chamber.

15. The combination of a syrup-jar to be supported for use in an inclined position, a cup therein, a guide, a lid for the jar, a stem pivotally hung beneath the lid, and a plunger carried by said stem and resting by gravity in an inclined position against said guide to enter the cup.

WALTER L. BODMAN.

Witnesses:
PAUL L. SCHMECHEL.
M. A. KIDDIE.